US005101677A

United States Patent [19]

Hammerschmitt

[11] Patent Number: 5,101,677
[45] Date of Patent: Apr. 7, 1992

[54] TRANSMISSION MOUNTED RANGE SELECTOR

[75] Inventor: Bruce T. Hammerschmitt, Indianapolis, Ind.

[73] Assignee: General Motors Corporation, Detroit, Mich.

[21] Appl. No.: 736,875

[22] Filed: Jul. 29, 1991

[51] Int. Cl.⁵ .................. B60K 20/02; F16H 3/08
[52] U.S. Cl. .................. 74/335; 74/473 R; 74/861
[58] Field of Search .............. 74/335, 473 R, 606 R, 74/861

[56] References Cited

U.S. PATENT DOCUMENTS

| | | | |
|---|---|---|---|
| 3,527,116 | 9/1970 | Kimberlin | 74/335 X |
| 3,587,351 | 6/1971 | Keller et al. | 74/335 X |
| 3,621,729 | 11/1971 | Andrushkiw et al. | 74/335 |
| 4,570,765 | 2/1986 | Makita | 74/335 X |
| 4,598,374 | 7/1986 | Klatt | 364/424.1 |
| 4,610,179 | 9/1986 | Parker | 74/335 |
| 4,748,863 | 6/1988 | McNinch, Jr. | 74/335 |
| 4,913,004 | 4/1990 | Panoushek et al. | 74/861 |
| 4,914,594 | 4/1990 | Sano | 364/424.1 |
| 4,960,008 | 10/1990 | Yen et al. | 74/473 R |

Primary Examiner—Dwight Diehl
Attorney, Agent, or Firm—Mark A. Navarre

[57] ABSTRACT

An electronic shift controller having a cast housing is externally mounted to a transmission housing and plug-in connectors directly couple signals between the controller and the transmission. A manually controlled shift selector shaft extends between the transmission and the controller to operate a forward/neutral/reverse shift valve in the transmission and shift selector switches in the controller. A simple harness couples power, speed and ignition sense signals to the controller.

7 Claims, 1 Drawing Sheet

U.S. Patent    Apr. 7, 1992    5,101,677
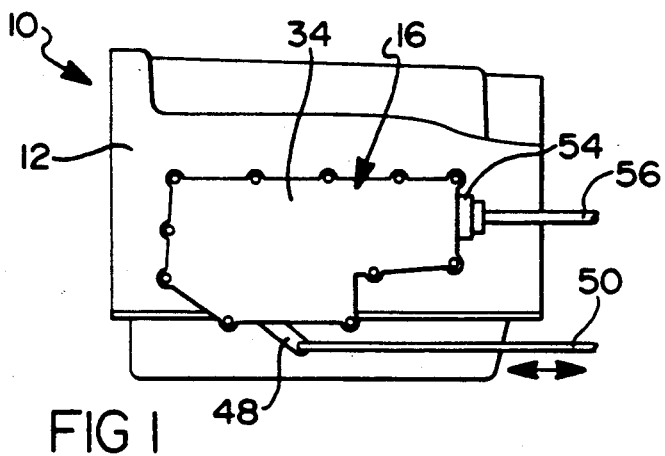
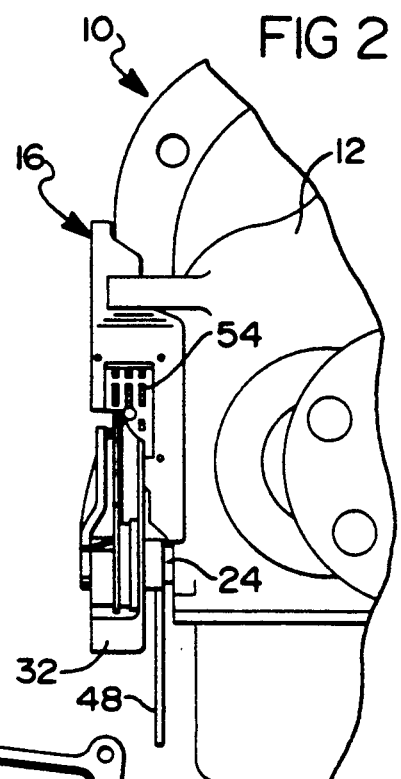
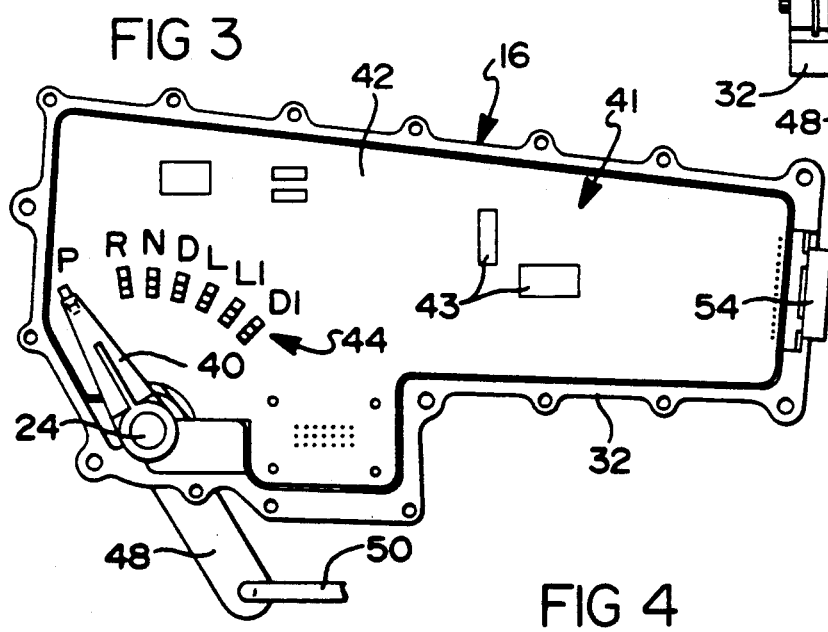
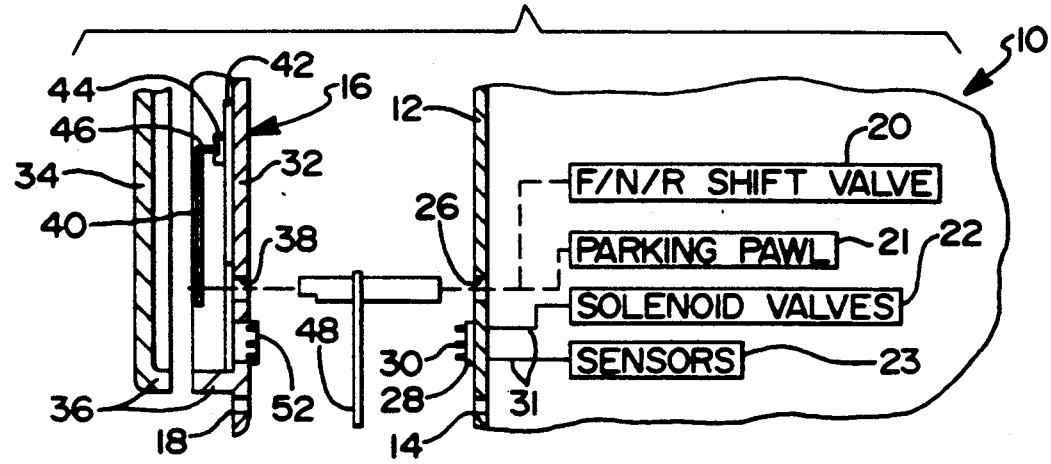

TRANSMISSION MOUNTED RANGE SELECTOR

FIELD OF THE INVENTION

This invention relates to an electronic shift controller for mounting on a transmission housing and the combination of the controller and the transmission.

BACKGROUND OF THE INVENTION

Electronically controlled transmissions generally comprise a gear train having a solenoid operated shifting apparatus, although a mechanical control link may be used for forward, neutral and reverse range selection. An electronic controller generates shift signals which are passed to the transmission, and the transmission has pressure and speed sensors which generate signals which are passed to the controller. The controller is mounted remotely from the transmission and a wiring harness between them carries the signals. The manual range selector incorporates a switch which produces range selection signals which are passed to the controller along with electrical power and other operating parameters. The transmission wiring harness also carries these inputs and thus becomes complex. In addition, it is sometimes a challenge to find a good location for the remote controller.

It is desirable to simplify the system by reducing the complexity of the wiring harness and eliminating the need for a remote controller location. Also it is advantageous to eliminate the need for an externally mounted selector switch.

SUMMARY OF THE INVENTION

It is therefore an object of this invention to provide an electronic transmission controller at the transmission having minimal wiring requirements.

It is another object of this invention to provide a transmission control system having no external selector switch.

It is still another object of this invention to provide an integrated transmission/controller package having minimal external electrical connections.

The invention is carried out by an electronic shift controller for a transmission which shifts ranges in response to electrical control signals and having a transmission case, comprising: a housing adapted for attachment to the transmission case; mechanical shift selector input means passing through the housing; an electronic shift control wholly contained within the housing and responsive to the input means for generating control signals; and means for coupling control signals from the control to the transmission.

The invention is further carried out by the combination of a transmission and an electronic controller for controlling shifting of the transmission comprising electrical and mechanical shift means in the transmission case; an electronic controller having a housing fastened to the transmission case; a manually operated shift selector shaft having one end passing into the housing to provide the mechanical control input and the other end passing into the case; the electronic controller having switch means actuated by the selector shaft and being responsive to the switch means for generating shift control signals; and means for coupling the shift control signals to the electrical shift means in the transmission case.

The above and other advantages of the invention will become more apparent from the following description taken in conjunction with the accompanying drawings wherein like references refer to like parts.

BRIEF DESCRIPTION OF THE DRAWINGS

FIG. 1 is a side elevational view of a transmission and an attached controller according to the invention.

FIG. 2 is a partly broken away end view of a portion of the transmission and controller of FIG. 1.

FIG. 3 is a side view of the controller of FIG. 1 with its cover removed.

FIG. 4 is an exploded view of a portion of the transmission and housing according to the invention.

DESCRIPTION OF THE INVENTION

The ensuing description is directed to a control arrangement developed for a transmission which has a mechanical shift connection to the transmission housing for operating forward-reverse shift valves in the transmission and electrical connections for operating solenoid operated range shift valves. While this is the preferred embodiment, the control could be adapted for a transmission which has no mechanical shift input but only electrical control inputs.

Referring to the drawings, a transmission 10 has a case 12 incorporating on its side an external mounting flange 14 for receiving a controller housing 16 which has a mating flange 18. The transmission case contains a mechanically operated shift valve 20 for forward/neutral/reverse selection, a mechanically operated parking pawl 21, solenoid valves 22 for range shift control and sensors 23 to provide speed and pressure data. One end of a shift selector shaft 24 passes through a suitable sealed journal 26 in the transmission case 12 and is operably coupled to the shift valve 20 and the parking pawl 21. An electrical plug-in connector 28 is mounted on the case 12 near the journal 26 and has outwardly extending pins 30 aligned parallel to the shaft 24 and electrically connected by conductors 31 to the solenoid valves 22 and the sensors 23.

The controller housing 16 is a two part casting comprising a base 32 and a cover 34, both of which are generally planar with edge flanges 36 which mate to seal the housing. The planar portions of the base and cover are generally perpendicular to the axis of the shift selector shaft 24. The other end of the shift selector shaft 24 passes through a suitable sealed journal 38 in the base 32 and carries a switch arm or lever 40 which moves through an arc when the shaft is rotatably indexed.

The electronic control 41 comprises a circuit board 42 mounted on the base 32 perpendicular to the axis of the shaft 24. The circuit board carrier the control electronics components 43 and an array of selector switches 44 arcuately arrayed about he shaft axis for cooperation with the switch arm 40. The switches 44 are selectively actuated by the arm 40 when the arm moves to the respective switch positions. The switches 44 shown are optical interrupters with an open light beam path and the switch arm 40 carries a finger 46 which selectively enters the paths for light beam interruption according to the arm position. Thus, the switches 44 and switch arm 40 comprise a selector switch which is entirely enclosed in the housing 16.

The housing 16 is slightly spaced from the transmission case 12 in the region of the shaft 24. In that space, a control lever 48 is attached to the shaft and extends down beyond the lower edge of the housing 16 for attachment to an operating cable or linkage 50 from the manually operated range selector, not shown. Also in or near that space, a connector 52 mounted on the housing 16 mates with the pins 30 of the connector 28 on the case 12 so that coupling the connectors 28 and 52, as well as assembly of the housing to the shaft, takes place by movement of the housing in the direction of the shaft axis. The connector 52 is electrically wired to the circuit board 42 to carry control signals via the connector 28 to the solenoid valves 22 and parameter signals from the sensors 23 to the circuit board.

An external electrical connector 54 on the housing allows connection to a harness 56 for coupling to the vehicle battery, an ignition sense signal, a speed sensor and a throttle position sensor to provide power and information needed for transmission shifting decisions. The harness 56 also carries outputs such as neutral start and reverse warning signals. The harness does not have wiring associated with range selection since that control information is input to the control 41 by the manual positioning of the lever 48.

The controller housing 16 is easily assembled to the transmission case 12 by sliding it onto the shift selector shaft 24 and, in the same movement, joining the plug-in connectors which couple the controller to the transmission. The controller housing is then bolted to the transmission case, the harness 56 is plugged into its connector 54, and the shift selector arm 48 is attached to the input link or cable.

In operation, driver manipulation of the shift linkage 50 indexes the shaft 24 to appropriately operate the parking pawl and the forward/neutral/reverse shift valve 20 by direct mechanical connection. At the same time, the shaft moves the switch arm to one of the switches 44 in accordance with the selected shift range and the resulting switch operation conditions the control to send actuating signals to the solenoid valves 22. Sensor signals from the sensors 23 and speed and ignition sense signals supplied by the harness 56 are used by the control along with the shaft position to determine the solenoid operation.

It will thus be seen that the direct connection of the housing 16 to the transmission case 12 eliminates the need for a harness carrying shift signals to the solenoid valves and sensor signals to the controller circuit board. Further, the mechanical input of the range selector information to the controller eliminates the need for harness wiring to carry that information. Thus, only one harness is associated with the controller and it has minimal complexity.

The embodiments of the invention in which an exclusive property or privilege is claimed are defined as follows:

1. An electronic shift controller for a transmission which shifts ranges in response to electrical control signals and having a transmission case, comprising:

a housing adapted for attachment to the transmission case;
mechanical shift selector input means passing through the housing;
an electronic shift control wholly contained within the housing and responsive to the input means for generating control signals; and
means for coupling control signals from the control to the transmission.

2. The invention as defined in claim 1 wherein:
the mechanical shift selector input means is a shaft positioned by manual control in accordance with selected shift ranges; and
the electronic control includes means responsive to shaft position for sensing selected shift ranges.

3. The invention as defined in claim 1 wherein:
the electronic control is contained on a circuit board;
the mechanical shift selector input means is a rotatable shaft passing through the case normal to the circuit board and positioned in accordance with desired shift ranges, and includes a switch arm on the shaft and movable therewith to a specific position for each shift range; and
the electronic control includes a switch at each said specific position for detecting the switch arm.

4. The invention as defined in claim 3 wherein the switches are optical interrupters and the switch arm is configured to selectively cooperate with each optical interrupter for effecting switching.

5. The combination of a transmission and an electronic controller for controlling shifting of the transmission comprising:
the transmission having a case and electrical and mechanical shift means in the case responsive to respective mechanical and electrical control inputs;
the electronic controller having a housing fastened to the transmission case;
a manually operated shift selector shaft having one end passing into the housing to provide the mechanical control input and the other end passing into the case;
the electronic controller having switch means actuated by the selector shaft and being responsive to the switch means for generating shift control signals; and
means for coupling the shift control signals to the transmission.

6. The invention as defined in claim 5 wherein the means for coupling the shift control signals to the transmission comprises mating electrical plug-in connectors on the case and the housing.

7. The invention as defined in claim 5 wherein the transmission includes sensors for producing information signals; and
the means for coupling shift control signals to the transmission include means for coupling information signals from the transmission to the controller.

* * * * *